(12) United States Patent
Wahl et al.

(10) Patent No.: US 7,198,142 B2
(45) Date of Patent: Apr. 3, 2007

(54) MACHINE UNIT COMPRISING A DRIVE AND A MACHINE

(75) Inventors: Georg Wahl, Crailsheim (DE); Hans Schirle, Stimpfach (DE); Wolfgang Sautter, Crailsheim (DE)

(73) Assignee: Voith Turbo GmbH & Co. KG (DE)

( * ) Notice: Subject to any disclaimer, the term of this patent is extended or adjusted under 35 U.S.C. 154(b) by 0 days.

(21) Appl. No.: 10/362,029

(22) PCT Filed: Jul. 18, 2001

(86) PCT No.: PCT/EP01/08273

§ 371 (c)(1),
(2), (4) Date: Jun. 2, 2003

(87) PCT Pub. No.: WO02/14716

PCT Pub. Date: Feb. 21, 2002

(65) Prior Publication Data

US 2004/0007436 A1 Jan. 15, 2004

(30) Foreign Application Priority Data

Aug. 16, 2000 (DE) ................ 100 39 813

(51) Int. Cl.
*F16H 45/02* (2006.01)
(52) U.S. Cl. ..................... 192/3.3; 192/69.9
(58) Field of Classification Search ............. 192/3.21, 192/3.28, 3.29, 3.3, 69, 69.9, 85 A
See application file for complete search history.

(56) References Cited

U.S. PATENT DOCUMENTS

| 2,301,645 A | 11/1942 | Sinclair | 60/365 |
| 3,677,003 A | 7/1972 | Schneider | 60/361 |
| 3,888,082 A | 6/1975 | Haide | 60/361 |
| 4,073,139 A | 2/1978 | Armasow et al. | 60/357 |
| 4,641,549 A | 2/1987 | Muller | 74/732 |
| 4,686,822 A | 8/1987 | Frutschi | 60/39.02 |
| 4,848,084 A | 7/1989 | Wirtz | 60/342 |
| 4,951,467 A | 8/1990 | Walsh et al. | 60/361 |
| 6,050,375 A * | 4/2000 | Gradu et al. | 192/3.22 |

(Continued)

FOREIGN PATENT DOCUMENTS

DE 3730339 3/1989

(Continued)

OTHER PUBLICATIONS

"Föttinger-Kupplungen und Föttinger-Getriebe: Konstruktion und Berechnung," by Dipl.-Ing. Ernst Kickbusch, Berlin/Göttingen/Heidelberg, 1963.

(Continued)

*Primary Examiner*—Saul Rodriguez
(74) *Attorney, Agent, or Firm*—Ostrolenk, Faber, Gerb & Soffen, LLP

(57) ABSTRACT

The invention relates to a high power machine unit. Said invention is characterized by the following features: a drive which has an output shaft; a machine which has a drive shaft; a converter (3) which is connected between drive and machine and can be filled and emptied; having a toothed clutch (4) which can be engaged and disengaged and is connected in parallel with the converter (3); one half (4.1) is firmly connected to the output shaft of the drive so as to rotate with it; the other half (4.2) of the clutch is firmly connected to the drive shaft of the machine so as to rotate with it.

23 Claims, 2 Drawing Sheets

U.S. PATENT DOCUMENTS 6,289,674 B1  9/2001  Halene et al. ............... 60/361
6,293,379 B1 *  9/2001  Gradu et al. ............... 192/3.22
6,463,740 B1  10/2002  Schmidt et al. ............ 192/3.29

FOREIGN PATENT DOCUMENTS

EP  0162253  11/1985
WO  02/12692  2/2002

OTHER PUBLICATIONS

"Hydrodynamische Getriebe Kupplungen Bremsen," by Voith.
"2.2.1. Einphasige Wandler," in Entwurf VDI 2153.

* cited by examiner

MACHINE UNIT COMPRISING A DRIVE AND A MACHINE

The invention relates to a machine unit comprising a drive and a machine. Said invention relates in particular to a machine unit in which the drive is an electric motor or a gas turbine and the machine is a compressor. It concerns extraordinarily high powers which are of the order of magnitude of 20 megawatts and above. Because of these extremely high power, the machines also have extraordinarily high revolving masses, which of course in turn lead to particular problems.

The requirements on the machine unit of the aforementioned type, in particular comprising a gas turbine and a compressor, are the following:

the compressor must be started up in a way without the drive being overloaded the compressor must be run up to a rotational speed which is equal to the rotational speed of the drive, that is to say the two machines must run in synchronism with each other after reaching synchronous running, a direct mechanical drive connection must be produced between drive and machine in some machine units of the aforementioned type, in particular comprising a gas turbine as drive and a compressor as machine, it may be necessary to allow the gas turbine to run continuously, specifically even when the compressor is switched off.

In the case of smaller machine units comprising drive and machine, clutches subject to slip, for example friction clutches or plate clutches, can be connected between these two machines at low rotational speeds. However, such clutches can be used only in the case of low powers and small masses, which are a fraction of the value of the machine units mentioned here. In the case of machine units with the aforementioned extremely high powers and rotational speeds, the use of such clutches is ruled out, however.

The invention is based on the object of providing a machine unit comprising a drive, a machine and a transmission element connected between these two, in particular comprising a gas turbine and a compressor, which is designed for extremely high powers and rotational speeds, with which the machine can be started up reliably and gently for the drive, in which the drive and the machine can be run up to synchronous rotational speeds, and where the drive can continue to run although the machine is stopped.

This object is achieved by the features of claim 1.

The inventors have therefore found a perfect solution for the problem while solving all the aforementioned sub tasks.

The converter according to the invention can be filled and emptied. One half of the toothed clutch is firmly seated on the drive shaft, and therefore on the pump wheel, so as to rotate with it, while the other half of the clutch is firmly seated on the output shaft, and therefore on the turbine wheel, so as to rotate with it. The clutch is a switchable sliding clutch, in which the two halves of the clutch can be brought into engagement by means of displacement in the axial direction.

Start up is carried out as follows, illustrated using the example of a machine unit comprising a gas turbine and a compressor:

(1) First of all, the gas turbine is started; the compressor is stationary.
(2) The converter is filled.
(3) The compressor is run up by the drive on account of the converter filling and with appropriate adjustment of the guide vanes of the converter, specifically until synchronous running with the drive is achieved.
(4) The presence of synchronous running is registered by means of sensors.
(5) The toothed clutch is then engaged. After the toothed clutch has been engaged, torque is transmitted from the gas turbine to the compressor over two paths, firstly on the path via the converter and secondly via the path via the toothed clutch. The two force flows run parallel to each other.
(6) The converter is then emptied, so that only the toothed clutch still transmits torque from the gas turbine to the compressor.

During shutdown, there are two possible ways of operating the machine unit.

Possibility A:

(1) The gas turbine is switched off and run downs more or less slowly with the compressor.
(2) The clutch is disengaged, which can be done by means of deliberate intervention or by an automatic mechanism.
(3) Drive and compressor come to a standstill, uncoupled from each other.

Possibility B:

(1) The empty converter is filled with operating medium again.
(2) The clutch is disengaged.
(3) The converter is emptied. Although the gas turbine continues to run, no more torque is transmitted to the compressor, so that the latter comes to a standstill.

Possibility B can be particularly advantageous. Applications can be conceived in which the compressor is used only intermittently, but the gas turbine is to continue to run for reasons connected with the gas turbine process.

The invention is explained in more detail using the drawing, in which the following are illustrated in detail:

Figure 1:
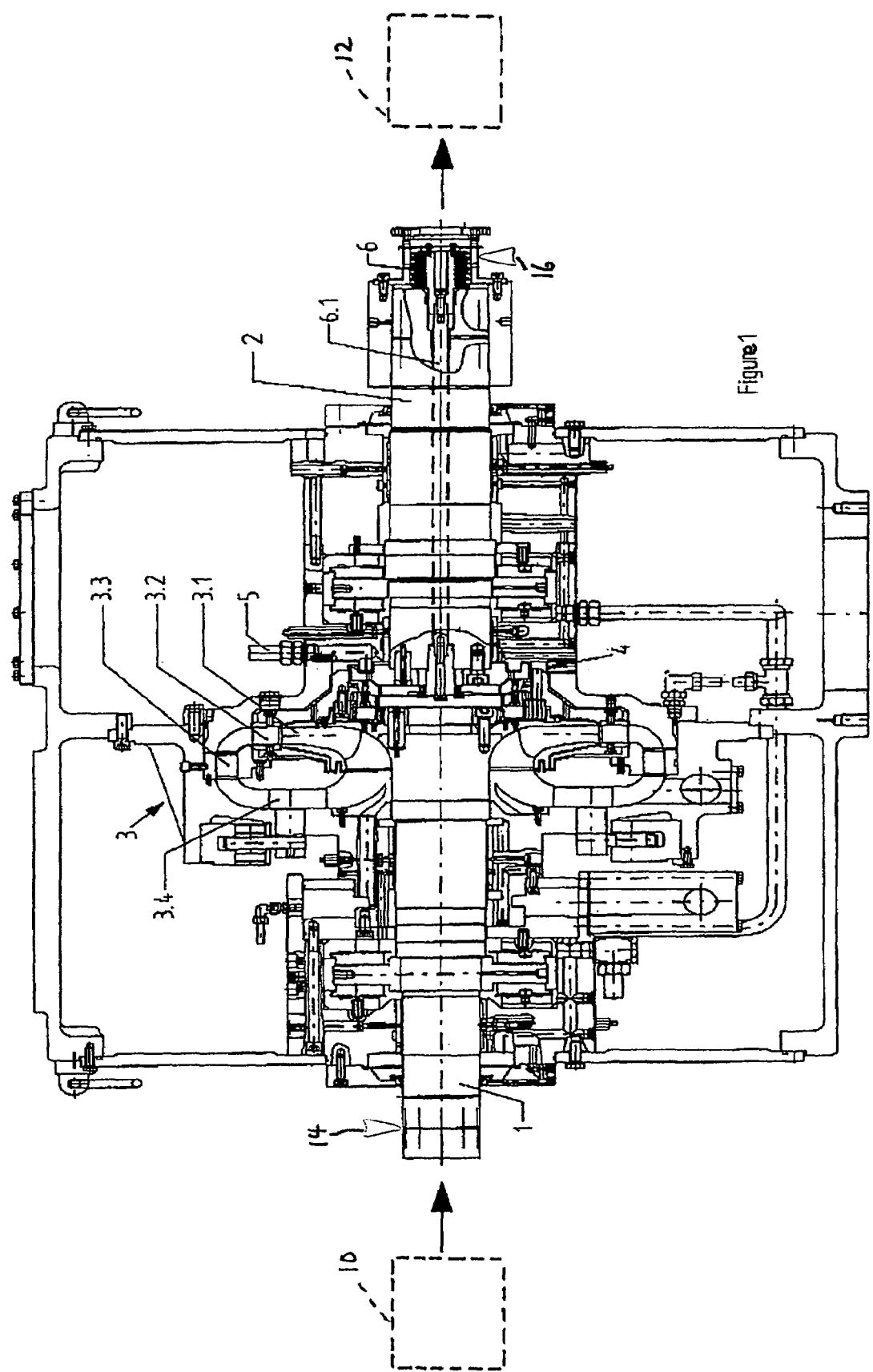
FIG. 1 shows a substantial part of a machine unit according to the invention, namely a converter according to the invention and a toothed clutch according to the invention.

Of a machine unit comprising a gas turbine and a compressor, FIG. 1 shows only the force transmission unit located between these two, comprising the converter 3 and the toothed clutch 4. Converter 3 and toothed clutch 4 are therefore connected between the gas turbine, not shown here, and the compressor, not shown here.

Converter 3 and toothed clutch 4 are connected in parallel with each other. Both the converter 3 and the toothed clutch 4 can transmit torque from the converter input shaft 1 to the converter output shaft 2 in each case on their own but also jointly.

Converter 3 can be filled and emptied. It comprises a pump wheel 3.1 and a turbine wheel 3.2. It further comprises a stationary guide vane wheel 3.3 and an adjustable guide vane 3.4.

The pump wheel 3.1 of the converter 3 is firmly connected to the input shaft 1 so as to rotate with it. The turbine wheel 3.2 of the converter is firmly connected to the output shaft 2 so as to rotate with it.

Figure 2:
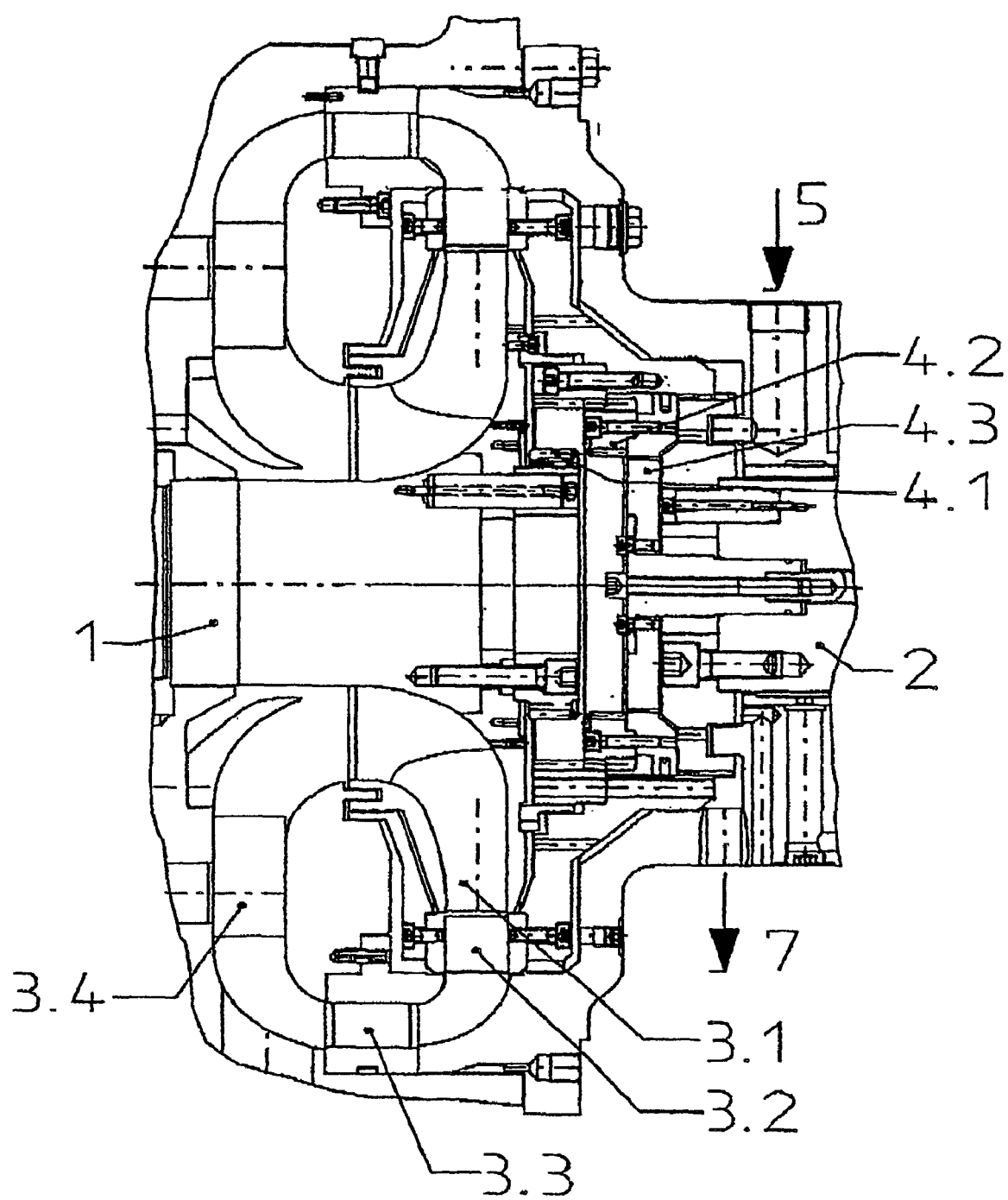
FIG. 2 shows an enlarged detail from the subject of FIG. 1 in the area of converter and toothed clutch.

FIG. 2 reveals the relationships in the area of converter and toothed clutch in more detail. The toothed clutch 4 comprises two clutch halves. One half of the clutch—a pinion 4.1—is firmly connected to the input shaft 1 so as to rotate with it. The other half—an internal gear 4.2—is firmly connected to the output shaft 2 of the compressor so as to rotate with it. Internal gear 4.2 can be displaced to the left in FIG. 2. If this displacement is made, the clutch 4 is therefore engaged.

A connection 5 for control oil is provided. Through said connection, control oil can be introduced into the interior of the clutch housing, specifically in such a way that it acts on a piston 4.3 which in turn displaces the internal gear 4.2 to the left. A valve, not illustrated here, is assigned to the connection 5.

In conjunction with the actuation of the clutch, a set of disk springs 6 is important—see FIG. 1. While control oil displaces the piston 4.3 to the left when it is let into the connection 5, and the clutch 4 therefore engages, the disk springs 6 attempt the opposite. They have a tendency to disengage the clutch 4.

As described above, during the starting operation, synchronism is produced between the gas turbine and the compressor and therefore also between the input shaft 1 and the output shaft 2. The fact that synchronism is present is registered by sensors not shown here. At this instant, the aforementioned valve belonging to the control oil connection 5 is opened. Control oil enters, acts on the piston 4.3 and displaces the internal gear 4.2 to the left, so that the clutch 4 is engaged. It remains engaged as long as the pressure of the control oil remains on the piston 4.3. For this reason, the valve upstream of the connection 5 is kept open for as long as it is wished to keep the clutch engaged.

If it is desired to disengage the clutch 4, then the aforementioned valve belonging to the control oil connection 5 is closed, and at another point care is taken that control oil can escape, for example by opening an outlet 7—see FIG. 2. If these conditions are present—control oil feed at connection 5 closed and control oil discharge 7 opened—then only the springs 6 act on the piston 4.3 via a rod 6.1, so that the piston 4.3 is moved to the right in FIG. 2, and therefore so is the internal gear 4.2. The clutch is disengaged, and no more torque is transmitted via the clutch 4.

However, the converse function is also conceivable: for example, engagement can be brought about by means of spring force and disengagement again by means of hydraulic pressure.

The invention claimed is:

1. A converter for transmitting a drive force, comprising:
   an input shaft of said converter being connectable with a rotation drive for being driven to rotate by said rotation drive;
   an output shaft of said converter for being rotated; and
   the converter being connected between the input shaft and the output shaft enabling the rotation received at the input shaft to be transmitted to the output shaft to rotate the output shaft, the converter further comprising:
   a pump wheel connected with the input shaft to be rotated by the input shaft;
   a turbine wheel connected with the output shaft for rotating the output shaft;
   the pump and turbine wheels being so shaped as to together define a chamber for receiving a fluid for acting on vanes in the chamber for transmission of rotation between the input shaft and the output shaft, the chamber being selectively fillable and emptyable for respectively causing the transmission of rotation between the pump and turbine wheels and discontinuing the transmission of rotation through the converter;
   a clutch connected between the input shaft and the output shaft and connected in parallel with the converter, whereby fluid in the converter can transmit rotation between the input shaft and the output shaft via the converter and the clutch can be engaged for transmitting rotation between the input shaft and the output shaft;
   the clutch is a switchable clutch with a first engageable clutch part firmly seated on the input shaft to rotate with the input shaft and a second clutch part firmly seated on the output shaft to rotate with the output shaft, such that engagement of the first and second parts of the clutch drives the output shaft to rotate due to rotation of the input shaft, and the clutch is switchable between engagement of the first and second parts thereof and disengagement of the first and second parts thereof;
   wherein the clutch is a toothed clutch, with each clutch part having respective meshable teeth shaped and positioned for meshing with the teeth of the other clutch part when the clutch parts are in the engaged position;
   wherein one of said clutch parts is a pinion secured at its center of rotation with outwardly facing teeth on a respective one of said shafts for rotation with said one shaft, while the other of said clutch parts is an internal gear secured at its center of rotation with inwardly facing teeth on the other of said shafts for rotation with said other shaft.

2. The converter of claim 1, further comprising a clutch switching actuator connected with at least one of the parts of the clutch for moving the at least one clutch part between an engaged position with the first and second clutch parts engaged and a disengaged position with the first and second clutch parts disengaged.

3. The converter of claim 2, wherein the switching actuator comprises a hydraulic unit comprising a piston and a cooperating cylinder located between the first clutch part and a support for the hydraulic unit;
   a pressure medium connection to the cylinder for operating on the piston via the cylinder to move the piston to move the first clutch part from one of the engaged and disengaged positions to the other of the engaged and disengaged positions.

4. The converter connection of claim 3, further comprising a return spring operating on the piston for returning the piston to move the first clutch part from the other of the engaged and disengaged positions to the one of the engaged and disengaged positions.

5. The converter of claim 2, wherein the pressure medium connection operates through the cylinder to drive the piston to bring the first clutch part into engagement with the second clutch part.

6. The converter unit of claim 5, further comprising a return spring operating on the piston to move the first clutch part out of engagement with the second clutch part.

7. The converter unit of claim 2, further comprising:
   sensors for registering the rotational speeds of the input shaft and the output shaft;
   a device having a first condition which enables delivery of a pressure medium to the cylinder of the hydraulic unit for operating the first clutch part to one of the engaged and disengaged conditions thereof, and the device being operable for cutting off the pressure medium to the hydraulic unit, the device being connected to the sensors so that upon the output shaft achieving a selected rotational speed with respect to the input shaft through action of the converter, the sensors causing the device to operate the hydraulic unit to selectively move the first clutch part into or out of engagement with the second clutch part.

8. The converter of claim 1, wherein a rotation drive is connected to the input shaft comprising a gas turbine and the output shaft is connected with a compressor for driving the compressor.

9. The converter of claim 1,
further comprising first guide vane wheel which is stationary and a second guide vane wheel which is adjustable.

10. A converter for a high power machine unit, comprising:
an input shaft which is connectable to a drive, and an output shaft which is connectable to a working machine, and said converter can be filled and emptied; and
a switchable toothed clutch, which is connected in parallel with the converter, said clutch being actuated by a hydraulic unit supplied with a pressure medium;
one half of the clutch being firmly seated on the input shaft of the converter so as to rotate with it; and
the other half of the clutch being firmly seated on the output shaft of the converter so as to rotate with it;
sensors are provided for registering the rotational speeds of drive and machine; and
a device is provided for cutting off the medium and for letting the medium out of the hydraulic unit;
wherein one of said clutch halves is a pinion secured at its center of rotation with outwardly facing teeth on a respective one of said shafts for rotation with said one shaft, while the other of said clutch halves is an internal gear secured at its center of rotation with inwardly facing teeth on the other of said shafts for rotation with said other shaft.

11. The converter of claim 10,
the converter further comprising a stationary guide vane wheel and an adjustable guide vane wheel.

12. The converter of claim 11, wherein a rotation drive is connected to the input shaft comprising a gas turbine and the output shaft is connected with a compressor for driving the compressor.

13. The converter of claim 10, wherein a rotation drive is connected to the input shaft comprising a gas turbine and the output shaft is connected with a compressor for driving the compressor.

14. A high power machine unit, comprising:
a drive which has a shaft;
a machine which has a shaft;
a converter having an input shaft connected to the shaft of the drive, and an output shaft connected to the shaft of the machine, and said converter can be filled and emptied; and
a switchable toothed clutch, which is connected in parallel with the converter, said clutch being actuated by a hydraulic unit supplied with a pressure medium;
one half of the clutch being firmly seated on the input shaft of the converter so as to rotate with it; and
the other half of the clutch being firmly seated on the output shaft of the converter so as to rotate with it;
sensors are provided for registering the rotational speeds of drive and machine; and
a device is provided for cutting off the medium and for letting the medium out of the hydraulic unit;
wherein one of said clutch halves is a pinion secured at its center of rotation with outwardly facing teeth on a respective one of said shafts for rotation with said one shaft, while the other of said clutch halves is an internal gear secured at its center of rotation with inwardly facing teeth on the other of said shafts for rotation with said other shaft.

15. The high power machine unit of claim 14,
the converter further comprising a stationary guide vane wheel and an adjustable guide vane wheel.

16. The machine unit as claimed in claim 14, characterized by the following features:
the toothed clutch is assigned a switching actuator;
the switching actuator has said hydraulic unit, comprising a piston and a cylinder, which can be acted on with the effect of engaging the toothed clutch by means of said pressure medium which can be applied via a medium connection;
a return spring is provided, which acts with the effect of disengaging the toothed clutch.

17. The machine unit as claimed in claim 16, characterized in that the drive is a gas turbine and the machine is a compressor.

18. The machine unit as claimed in claim 14, characterized in that the drive is a gas turbine and the machine is a compressor.

19. A converter for transmitting a drive force, comprising:
an input shaft of said converter being connectable with a rotation drive for being driven to rotate by said rotation drive;
an output shaft of said converter for being rotated; and
the converter being connected between the input shaft and the output shaft enabling the rotation received at the input shaft to be transmitted to the output shaft to rotate the output shaft, the converter further comprising:
a pump wheel connected with the input shaft to be rotated by the input shaft;
a turbine wheel connected with the output shaft for rotating the output shaft;
the pump and turbine wheels being so shaped as to together define a chamber for receiving a fluid for acting on vanes in the chamber for transmission of rotation between the input shaft and the output shaft, the chamber being selectively fillable and emptyable for respectively causing the transmission of rotation between the pump and turbine wheels and discontinuing the transmission of rotation through the converter;
a clutch connected between the input shaft and the output shaft and connected in parallel with the converter, whereby fluid in the converter can transmit rotation between the input shaft and the output shaft via the converter and the clutch can be engaged for transmitting rotation between the input shaft and the output shaft;
the clutch is a switchable clutch with a first engageable clutch part firmly seated on the input shaft to rotate with the input shaft and a second clutch part firmly seated on the output shaft to rotate with the output shaft, such that engagement of the first and second parts of the clutch drives the output shaft to rotate due to rotation of the input shaft, and the clutch is switchable between engagement of the first and second parts thereof and disengagement of the first and second parts thereof;
wherein the clutch is a toothed clutch, with each clutch part having respective meshable teeth shaped and positioned for meshing with the teeth of the other clutch part when the clutch parts are in the engaged position;
wherein said toothed clutch is disposed at a first position along an axial direction of said shafts, and said converter is disposed at a second position along said axial direction of said shafts, said first and second positions being spaced away from each other along said axial direction of said shafts.

20. A converter for a high power machine unit, comprising:
an input shaft which is connectable to a drive, and an output shaft which is connectable to a working machine, and said converter can be filled and emptied; and
a switchable toothed clutch, which is connected in parallel with the converter, said clutch being actuated by a hydraulic unit supplied with a pressure medium;
one half of the clutch being firmly seated on the input shaft of the converter so as to rotate with it; and
the other half of the clutch being firmly seated on the output shaft of the converter so as to rotate with it;
sensors are provided for registering the rotational speeds of drive and machine; and
a device is provided for cutting off the medium and for letting the medium out of the hydraulic unit;
wherein said toothed clutch is disposed at a first position along an axial direction of said shafts, and said converter is disposed at a second position along said axial direction of said shafts, said first and second positions being spaced away from each other along said axial direction of said shafts.

21. A high power machine unit, comprising:
a drive which has a shaft;
a machine which has a shaft;
a converter having an input shaft connected to the shaft of the drive, and an output shaft connected to the shaft of the machine, and said converter can be filled and emptied; and
a switchable toothed clutch, which is connected in parallel with the converter, said clutch being actuated by a hydraulic unit supplied with a pressure medium;
one half of the clutch being firmly seated on the input shaft of the converter so as to rotate with it; and
the other half of the clutch being firmly seated on the output shaft of the converter so as to rotate with it;
sensors are provided for registering the rotational speeds of drive and machine; and
a device is provided for cutting off the medium and for letting the medium out of the hydraulic unit;
wherein said toothed clutch is disposed at a first position along an axial direction of said shafts, and said converter is disposed at a second position along said axial direction of said shafts, said first and second positions being spaced away from each other along said axial direction of said shafts.

22. A converter for transmitting a drive force, comprising:
an input shaft of said converter being connectable with a rotation drive for being driven to rotate by said rotation drive;
an output shaft of said converter for being rotated; and
the converter being connected between the input shaft and the output shaft enabling the rotation received at the input shaft to be transmitted to the output shaft to rotate the output shaft, the converter further comprising:
a pump wheel connected with the input shaft to be rotated by the input shaft;
a turbine wheel connected with the output shaft for rotating the output shaft;
the pump and turbine wheels being so shaped as to together define a chamber for receiving a fluid for acting on vanes in the chamber for transmission of rotation between the input shaft and the output shaft, the chamber being selectively fillable and emptyable for respectively causing the transmission of rotation between the pump and turbine wheels and discontinuing the transmission of rotation through the converter;
a clutch connected between the input shaft and the output shaft and connected in parallel with the converter, whereby fluid in the converter can transmit rotation between the input shaft and the output shaft via the converter and the clutch can be engaged for transmitting rotation between the input shaft and the output shaft;
the clutch is a switchable clutch with a first engageable clutch part firmly seated on the input shaft to rotate with the input shaft and a second clutch part firmly seated on the output shaft to rotate with the output shaft, such that engagement of the first and second parts of the clutch drives the output shaft to rotate due to rotation of the input shaft, and the clutch is switchable between engagement of the first and second parts thereof and disengagement of the first and second parts thereof;
wherein the clutch is a toothed clutch, with each clutch part having respective meshable teeth shaped and positioned for meshing with the teeth of the other clutch part when the clutch parts are in the engaged position; and
wherein said first and second clutch parts of said clutch are disposed at a first position along an axial direction of said shafts, and said pump wheel and said turbine wheel of said converter are disposed at a second position along said axial direction of said shafts, said first and second positions being spaced away from each other along said axial direction of said shafts.

23. A converter for transmitting a drive force, comprising:
an input shaft of said converter being connectable with a rotation drive for being driven to rotate by said rotation drive;
an output shaft of said converter for being rotated; and
the converter being connected between the input shaft and the output shaft enabling the rotation received at the input shaft to be transmitted to the output shaft to rotate the output shaft, the converter further comprising:
a pump wheel connected with the input shaft to be rotated by the input shaft;
a turbine wheel connected with the output shaft for rotating the output shaft;
the pump and turbine wheels being so shaped as to together define a chamber for receiving a fluid for acting on vanes in the chamber for transmission of rotation between the input shaft and the output shaft, the chamber being selectively fillable and emptyable for respectively causing the transmission of rotation between the pump and turbine wheels and discontinuing the transmission of rotation through the converter;
a clutch connected between the input shaft and the output shaft and connected in parallel with the converter, whereby fluid in the converter can transmit rotation between the input shaft and the output shaft via the converter and the clutch can be engaged for transmitting rotation between the input shaft and the output shaft;
the clutch is a switchable clutch with a first engageable clutch part firmly seated on the input shaft to rotate with the input shaft and a second clutch part firmly seated on the output shaft to rotate with the output shaft, such that engagement of the first and second parts of the clutch drives the output shaft to rotate due to rotation of the input shaft, and the clutch is switchable between engagement of the first and second parts thereof and disengagement of the first and second parts thereof;

wherein the clutch is a toothed clutch, with each clutch part having respective meshable teeth shaped and positioned for meshing with the teeth of the other clutch part when the clutch parts are in the engaged position; and wherein when meshed with each other, the respective meshable teeth of said first and second clutch parts are separated from said converter along a lengthwise direction of said shafts, and do not mesh with either said pump wheel or said turbine wheel of said converter.

* * * * *